US011952031B2

(12) United States Patent
Eichhorn et al.

(10) Patent No.: US 11,952,031 B2
(45) Date of Patent: Apr. 9, 2024

(54) STEERING HANDLE OF A VEHICLE

(71) Applicant: Bayerische Motoren Werke Aktiengesellschaft, Munich (DE)

(72) Inventors: Julian Eichhorn, Menlo Park, CA (US); Gunnar Franz, Ottobrunn (DE); Christian Froemel, Kolbermoor (DE); Zoltan Major, Munich (DE); Martin Wiesinger, Lamerdingen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 386 days.

(21) Appl. No.: 17/292,150

(22) PCT Filed: Oct. 16, 2019

(86) PCT No.: PCT/EP2019/078103
§ 371 (c)(1),
(2) Date: May 7, 2021

(87) PCT Pub. No.: WO2020/094350
PCT Pub. Date: May 14, 2020

(65) Prior Publication Data
US 2021/0394812 A1    Dec. 23, 2021

(30) Foreign Application Priority Data
Nov. 9, 2018  (DE) ............... 10 2018 128 135.8

(51) Int. Cl.
*B62D 1/04* (2006.01)
*B60W 50/12* (2012.01)

(52) U.S. Cl.
CPC ............... *B62D 1/04* (2013.01); *B60W 50/12* (2013.01)

(58) Field of Classification Search
CPC .. B62D 1/02; B62D 1/04; B62D 1/14; B60W 50/12
See application file for complete search history.

(56) References Cited

U.S. PATENT DOCUMENTS 9,168,943 B2 * 10/2015  Greppi ............... B62D 1/06
10,800,441 B2 * 10/2020  Board ............... B62D 1/11
(Continued)

FOREIGN PATENT DOCUMENTS

| CN | 101287636 A | 10/2008 |
| CN | 106627724 A | 5/2017 |

(Continued)

OTHER PUBLICATIONS

Machine translation of DE 102016225452 A1 obtained on Jul. 24, 2023.*

(Continued)

*Primary Examiner* — Adam D Rogers
(74) *Attorney, Agent, or Firm* — Crowell & Moring LLP

(57) ABSTRACT

A steering handle of a vehicle includes a support structure, which is mounted for rotation about an axis of rotation and at each end of which an angled gripping element for a hand of a driver is provided such that the gripping element can be rotated relative to the support structure. In at least one defined driving state of the vehicle, the two gripping elements are or have been positioned by way of an actuating device in such a way that portions of the gripping elements that are provided for grasping with the hands of the driver lie on a line, the free ends of the portions facing one another.

2 Claims, 2 Drawing Sheets

(56) References Cited

U.S. PATENT DOCUMENTS

| | | |
|---|---|---|
| 2008/0257103 A1 | 10/2008 | Greppi |
| 2010/0229674 A1 | 9/2010 | Tanaka |
| 2023/0211821 A1* | 7/2023 | Froemel ............... B62D 1/12 |
| | | 280/771 |

FOREIGN PATENT DOCUMENTS

| | | | |
|---|---|---|---|
| CN | 115092239 A | * | 9/2022 |
| DE | 10 2006 006 995 A1 | | 8/2007 |
| DE | 10 2007 005 921 B3 | | 1/2008 |
| DE | 10 2016 225 452 A1 | | 6/2018 |
| DE | 102018128419 A1 | * | 5/2020 |
| DE | 102019101379 A1 | * | 7/2020 |
| DE | 102020110151 A1 | * | 10/2021 |
| DE | 102020118868 A1 | * | 1/2022 |
| DE | 102020118869 A1 | * | 1/2022 |
| DE | 102021200644 A1 | * | 7/2022 |
| JP | 11-342849 A | | 12/1999 |
| JP | 2004-352124 A | | 12/2004 |
| JP | 2005104406 A | * | 4/2005 |
| JP | 2007-45412 A | | 2/2007 |
| KR | 20190073754 A | * | 6/2019 |
| WO | WO 2017/060149 A1 | | 4/2017 |

OTHER PUBLICATIONS

Machine translation of DE 102006006995 A1 obtained on Oct. 20, 2023.*

International Search Report (PCT/ISA/210) issued in PCT Application No. PCT/EP2019/078103 dated Feb. 12, 2020 with English translation (six (6) pages).

German-language Written Opinion (PCT/ISA/237) issued in PCT Application No. PCT/EP2019/078103 dated Feb. 12, 2020 (five (5) pages).

German-language Search Report issued in German Application No. 10 2018 128 135.8 dated Dec. 10, 2018 with partial English translation (13 pages).

Chinese-language Office Action issued in Chinese Application No. 201980070993.0 dated Aug. 10, 2022 with English translation (13 pages).

* cited by examiner

STEERING HANDLE OF A VEHICLE

BACKGROUND AND SUMMARY OF THE INVENTION

The invention relates to a steering handle of a vehicle with a supporting structure which is mounted such that it can be rotated about a rotational axis and at the ends of which a grip element, for a hand of a driver, which is formed in a manner which is angled away, is provided. The grip element is formed in a manner which can be rotated with respect to the supporting structure.

In addition to JP-2004-352124 A, reference is made, in particular, to DE 10 2016 225 452 A1 with respect to the prior art.

Within the context of the development of at least partially autonomously driving double-track motor vehicles, the development of novel steering handles is also envisaged, with the aid of which a driver can steer the vehicle, that is to say can predefine or set its driving direction, in a non-automated driving mode which is still available. The steering wheels which have been used for this purpose up to now namely require a relatively large amount of installation space which might be used for other purposes at any rate when the vehicle is driving autonomously. In addition to a displacement of steering wheels during autonomous driving, novel steering handles are therefore also being researched which require less installation space at least in an autonomous driving state, in which the steering handle of the vehicle remains substantially in a neutral position which corresponds to driving operation controlled by a driver of driving straight ahead of the vehicle, even when driving around bends.

For this purpose, a steering handle has already been proposed, it being possible for what is known as the supporting structure here, which lies practically horizontally in the vehicle interior in said neutral position of the steering handle and is therefore called a transverse element in the closest prior art which was mentioned at the outset, to be of a very wide variety of designs. By way of gripping and suitable guiding of at least one grip element which is provided or attached in the end region of the supporting structure, the driver can rotate the supporting structure or steering handle about its rotational axis during non-autonomous driving operation. An electric motor drive apparatus for rotating the grip element has also already been proposed in the prior art, it also being possible, as an alternative, for a suitable mechanism to be provided, for example an endless flexible drive mechanism for rotating a grip element.

It is intended to be indicated here how further installation space can be gained by way of a steering handle at least in defined operating states.

This object is achieved by way of the features of the independent patent claim, which is characterized in that the two grip elements are positioned in at least one defined state of the vehicle by way of an actuating apparatus such that sections of the grip elements which are provided for gripping by way of the hands of the driver lie on one line, the free ends of said sections facing one another.

In one preferred embodiment, at least approximately L-shaped grip elements are provided, the limb of which, which is oriented at least approximately horizontally in the neutral position of the steering handle, is rotatably fastened by way of its end section which is closer to the rotational axis to the supporting structure which is likewise oriented horizontally in the neutral position of the steering handle, and a limb which is adjacent with respect to the other end of said horizontal limb and is oriented at least approximately vertically being configured or provided as a section for gripping by way of a hand of the driver.

The latter is also shown by the exemplary embodiment which is explained in the following text and is illustrated in the appended figures.

DETAILED DESCRIPTION OF THE DRAWINGS

Figure 1:
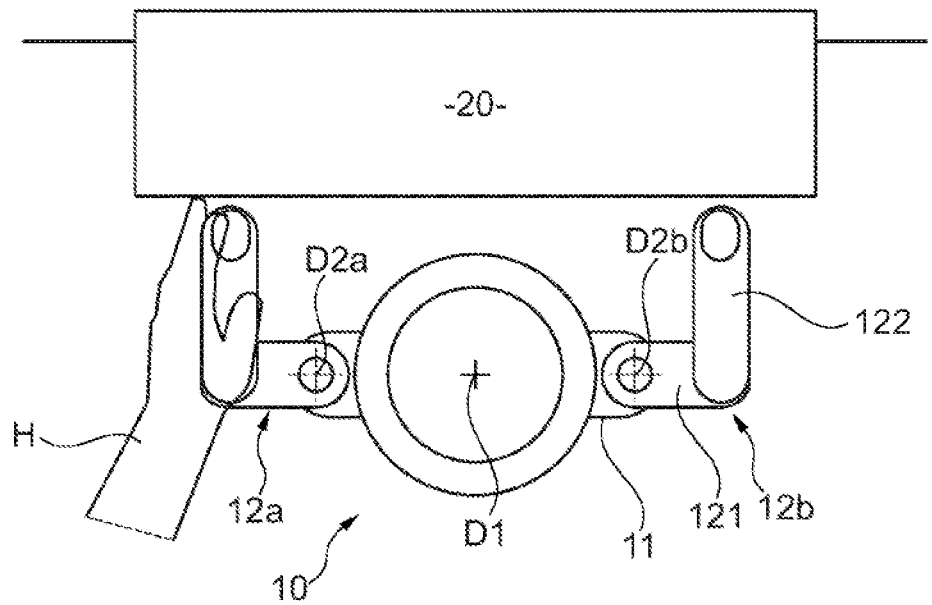
FIG. 1 shows a top view of the steering handle according to an embodiment of the invention in the neutral position, that is to say during driving straight ahead of the vehicle, if the latter is being controlled by a driver.

The designation 10 denotes a steering handle of a vehicle, for example of a passenger motor vehicle, behind which steering handle, as viewed from the driver, a dashboard with a display unit 20 (for example, for the driving speed and other information to be conveyed to the driver) is situated. A hand of the driver, namely his/her left hand, is denoted by way of the letter H.

The steering handle 10 consists of a supporting structure 11 which is mounted in the vehicle such that it can be rotated about a rotational axis D1 which runs perpendicularly with respect to the plane of the drawing in the illustrations of the figures. If the vehicle is driving straight ahead, the bar-shaped supporting structure 11 is horizontal, that is to say it forms, as it were, a horizontal transverse element. In each case one grip element 12*a*, 12*b* is arranged on the two end sections of the supporting structure 11, which grip element 12*a*, 12*b* for its part can be rotated with respect to the supporting structure 11, to be precise about a rotational axis D2*a*, D2*b* which runs at least approximately parallel to the rotational axis D1.

Each grip element 12*a*, 12*b* is angled away and/or is formed at least approximately in an L-shaped manner, and therefore consists of a first limb 121 and a second limb 122 which is substantially perpendicular with respect to the former. The latter is provided and configured to be gripped by the driver by way of his/her hand H, whereas the first limb 121 is articulated rotatably on the supporting structure 11 by way of its end section which faces away from the second limb 122. At least in the neutral position of the steering handle in accordance with FIG. 1, the first limbs 121 of the two grip elements 12*a*, 12*b* are oriented horizontally, with the result that the second limbs 122 lie in each case in a vertical plane. Therefore, a vertical plane is spoken of here because, as viewed in the vehicle, the rotational axis D1 is not oriented exactly, but rather merely approximately horizontally, and actually runs in a slightly inclined manner downward toward the front, as viewed from the driver.

In the neutral position of the steering handle 10, that is to say when the vehicle is being controlled by the driver and is driving straight ahead, the supporting structure 11 is oriented horizontally, and the grip element 12a is situated on the left-hand side and the grip element 12b is situated on the right-hand side, the second limbs 122 lying in each case on the outside, that is to say being spaced apart further from the rotational axis D1 than, for example, the central region of the respective associated first limb 121. The second limbs 122 are preferably oriented upward, starting from the first limb 121, with the result that the driver can grip the grip element 12a by way of his/her left hand H and can grip the grip element 12b by way of his/her right hand (not shown). In this state, the display unit 20 can advantageously be viewed by the driver as satisfactorily as possible, since it is not concealed by the steering handle 10.

Figure 2:
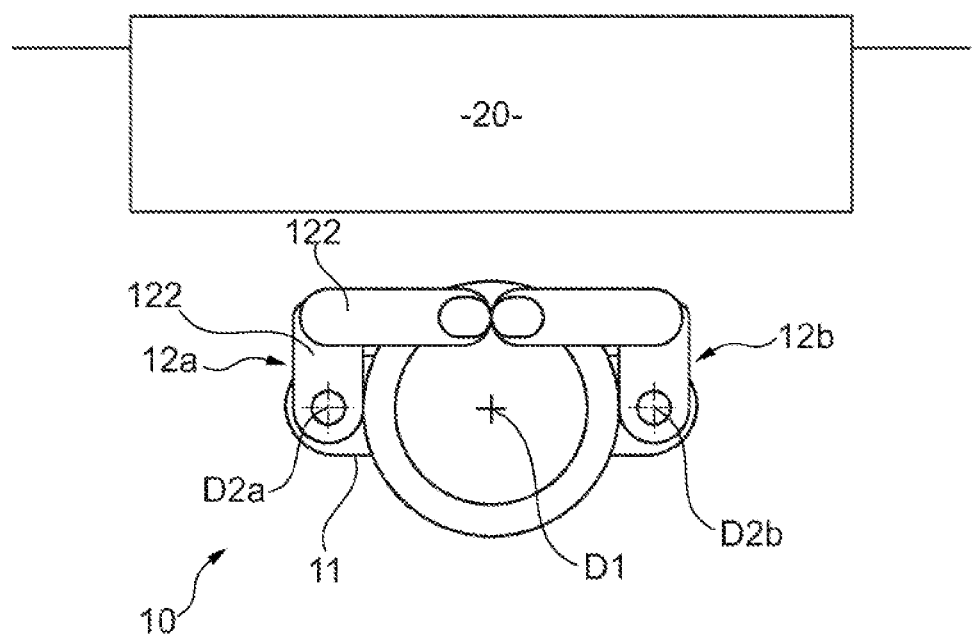
FIG. 2 shows the steering handle in a driving state, in which the vehicle is driving autonomously, that is to say without the assistance of the, or a, driver.

FIG. 2 shows the steering handle 10 in a special (or certain defined) state or driving state, namely in that driving state of autonomous driving, in which the vehicle moves in a highly automated or fully automated manner without the assistance of the driver. In this driving state, as much free space as possible is to be provided for the driver who is still seated on his/her seat and therefore in front of the steering handle 10, with the result that he/she can read a newspaper, for example, or can manage emails, for example, by means of a tablet or the like with the aid of the display unit. In order, in a driving state of this type, to provide a steering handle 10 which is as compact as possible, that is to say takes up as little installation space as possible, the two grip elements 12a, 12b are then positioned, in a manner which is triggered by way of a suitable actuating apparatus (not shown), in such a way that the sections of the grip elements 12a, 12b which are provided for being gripped by way of the hands of the driver, namely the second limbs 122, lie on a common line, the free ends of said sections or second limbs 122 facing one another. For this purpose, starting from the state in accordance with FIG. 1, the left-side grip element 12a is rotated by 90° in the clockwise direction, and the right-side grip element 12b is rotated by 90° counter to the clockwise direction. It goes without saying that a slight angular arrangement, that is to say if the two grip elements 12a, 12b do not enclose an angle of 180° in said certain driving state, but rather an angle of, for example, 165° or 195°, is likewise to fall within the defined state as "lying on a common line".

Figure 3:
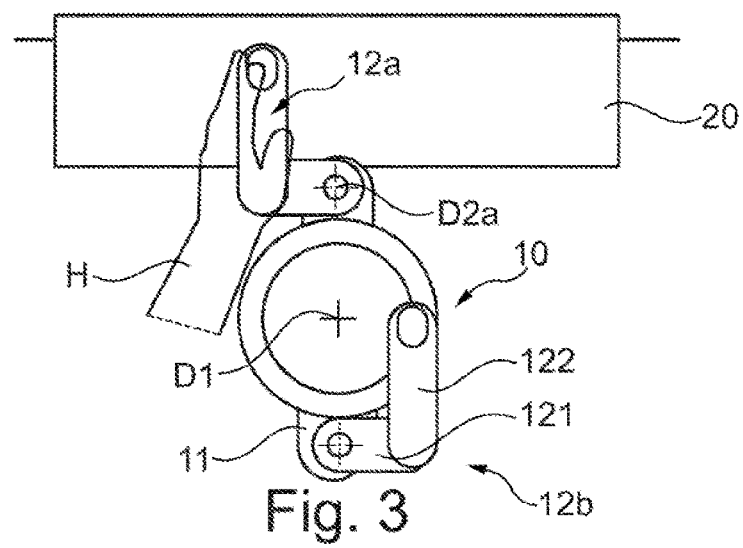
FIG. 3 shows the steering handle in a state, in which it is rotated by 90° in the clockwise direction starting from the state in accordance with FIG. 1.

FIG. 3 shows the steering handle 10 again in a driving state, in which the driver is controlling the vehicle, for which reason the left hand H of the driver which is still holding the left-hand grip element 12a is also shown here again. Starting from the state in accordance with FIG. 1, the driver has rotated the steering handle 10 by 90° in the clockwise direction for the transition to the state in accordance with FIG. 3, the supporting structure 11 having been rotated by 90° in the clockwise direction, and the two grip elements 12a, 12b having been moved merely translationally, as viewed in a coordinate system which is fixed on the vehicle, but not having been rotated. Here, in contrast, the grip elements 12a, 12b have been rotated with respect to the supporting structure 11, to be precise in each case by 90° counter to the clockwise direction.

Figure 4:
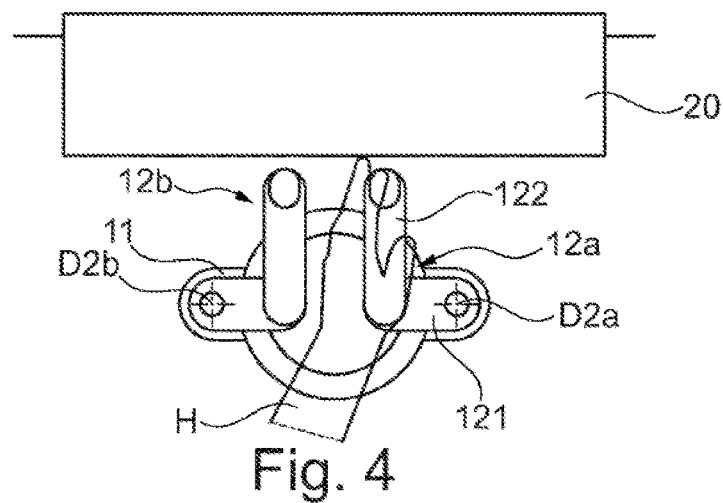
FIG. 4 shows the steering handle in a state, in which it is rotated by 180° in the clockwise direction starting from the state in accordance with FIG. 1.

FIG. 4 likewise shows the steering handle 10 in a driving state, in which the driver is controlling the vehicle, for which reason the left hand H of the driver which is still holding the left-hand grip element 12a is shown here. Starting from the state in accordance with FIG. 1, the driver has rotated the steering handle 10 by 180° in the clockwise direction for the transition to the state in accordance with FIG. 4, the supporting structure 11 having been rotated by 180° in the clockwise direction, and the two grip elements 12a, 12b having been moved merely translationally, as viewed in a coordinate system which is fixed on the vehicle, but not having been rotated. In contrast, the grip elements 12a, 12b have been rotated with respect to the supporting structure 11, to be precise in each case by 180° counter to the clockwise direction. As can be seen, although the driver has to move his/her left hand H to the right beyond the rotational axis D1 for this state, the distance by which he/she has to do this is relatively small on account of the angled-away design of the grip element 12a; on account of the first limb 121, the second limb 122 which is to be gripped comes to meet him/her, as it were, in the case of this rotation of the steering handle 10 which has been described in this way.

Figure 5:
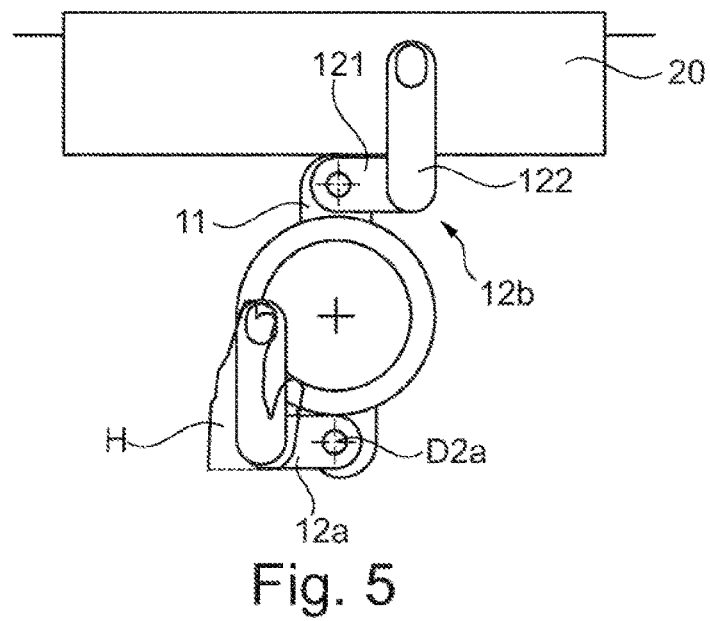
FIG. 5 shows the steering handle in a state, in which it is rotated by 270° in the clockwise direction starting from the state in accordance with FIG. 1.

FIG. 5 shows the steering handle 10 still in a driving state, in which the driver is controlling the vehicle, to be precise still with his/her left hand H which is still holding the grip element 12a. Starting from the state in accordance with FIG. 1, the driver has then rotated the steering handle 10 by 270° in the clockwise direction for the transition to the state in accordance with FIG. 5, the supporting structure 11 having been rotated by 270° in the clockwise direction, and the two grip elements 12a, 12b still being moved merely translationally, as viewed in a coordinate system which is fixed on the vehicle, but not having been rotated. In contrast, the grip elements 12a, 12b have been rotated with respect to the supporting structure 11, to be precise in each case by 270° counter to the clockwise direction, the grip element 12a then again lying on the left-hand side of the rotational axis D1 or, more precisely, of a vertical plane which contains the rotational axis D1.

As is apparent from the figures, there is merely a minimum overlap of the display unit 20 with a steering handle 10 of this type. The steering handle 10 never protrudes at all into the view of or through the windshield which lies above the display unit 20. Otherwise, a collision also does not occur, in the case of the steering operation which is shown in FIGS. 1, 3, 4 and 5, with the knees of the driver who is seated in front of the steering handle 10, which knees are not shown in the figures.

As is apparent from the figures, furthermore, single-handed steering without gripping is possible over the entire possible rotational range of the steering handle 10, which rotational range can lie, for example, in the order of magnitude of plus/minus 360° (that is to say in or counter to the clockwise direction). In addition, in particular, a steering handle 10 of this type can be folded together to be sufficiently small, that is to say can be changed into a design in accordance with FIG. 2 with a minimum installation space requirement. It is to be noted expressly here that a certain state of the vehicle, in which the steering handle 10 is folded together into the design described in the present case with a minimized installation space, is not restricted to the state of autonomous movement. It goes without saying that the steering handle 10 can also be moved into a design of this type in other states, for example in the case of parking with a short or relatively long duration, in which the driver is not steering the vehicle. It goes without saying that the steering handle 10 can additionally be moved in its entirety in this design, that is to say, for example, can be moved toward the dashboard. This can take place by electric motor, just as, for example, the grip elements 12a, 12b can likewise be rotated by electric motor with respect to the supporting structure 11, the grip elements 12a, 12b preferably being moved as described regardless of whether the driver is gripping them or not. In addition, for the case where the driver rotates the steering handle 10 counter to the clockwise direction, it goes without saying that the grip elements 12*a*, 12*b* are rotated in the clockwise direction with respect to the supporting structure 11.

What is claimed is:

1. A steering handle of a vehicle, comprising:
   a supporting structure which is mounted for rotation about an axis of rotation of the steering handle; and
   two angled gripping elements, wherein each angled gripping element is provided at a respective end of the supporting structure for a respective hand of a driver in a first driving state of the vehicle in which the driver is controlling the vehicle, such that each angled gripping element is rotatable relative to the supporting structure,
   wherein in a second driving state of the vehicle which is an autonomous driving state, the two angled gripping elements are or have been positioned such that portions of the two angled gripping elements that are provided for grasping with the hands of the driver in the first state of the vehicle lie on a common line, free ends of the portions facing one another along the common line, wherein the free ends of the portions of the two angled gripping elements overlap the support structure in a direction parallel to the axis of rotation of the steering handle in the second driving state of the vehicle.

2. The steering handle according to claim 1, wherein the two angled gripping elements are L-shaped,
   a leg of each angled gripping element oriented horizontally in a neutral position of the steering handle is rotatably fastened, by way of an end portion of the leg closer to the steering handle axis of rotation, to the supporting structure,
   the supporting structure is also oriented horizontally in the neutral position of the steering handle, and
   a vertically oriented leg of each angled gripping element is connected to the other end of the horizontal leg and is configured as the portion for grasping with the respective hand of the driver in the first driving state of the vehicle.

* * * * *